Patented Dec. 22, 1931

1,837,216

UNITED STATES PATENT OFFICE

ADOLF HAWERLANDER, OF NEW YORK, N. Y., ASSIGNOR TO HALIZITE CORPORATION, OF NEW YORK, N. Y., A CORPORATION OF NEW YORK

ART OF PLASTIC MATERIALS

No Drawing.   Application filed July 19, 1929. Serial No. 379,583.

The present invention relates to plastic materials, and more particularly to cementitious substances especially adapted for use in connection with the manufacture of composite lumber, compressed masses, laminated articles and agglutenated fibrous products which involve the employment of pressure and/or heat.

It is an object of my invention to provide a novel composition of matter of a plastic nature which is hard, tough and strong.

A further object of my invention is the provision of a plastic material which constitutes a very efficient cementitious binder particularly useful for cementing fibrous substances together.

It is also within the contemplation of my invention to provide a plastic material having waterproof qualities.

Other objects and advantages will become apparent from the following description.

Generally speaking, my invention involves the production of a plastic composition of matter by reacting a sugar-containing material with a solution of formaldehyde under the influence of heat and by permitting the reaction product to set and harden by itself in the air or the like or by the application of heat or heat and pressure. The set and hardened plastic mass is capable of receiving a good polish and is capable of being utilized as a binder for a variety of materials.

The invention will be better understood from the following typical examples which are merely given for the purpose of illustrating my invention.

Example No. 1

I mix about 500 grams of sugar, preferably brown cane sugar, in about 1000 cubic centimeters of 40% formaldehyde solution very thoroughly. The mixing is continued until the sugar is preferably completely dissolved in the formaldehyde solution. Heat is then applied to the solution until a temperature of approximately 40° C. is reached and this temperature is maintained for a period of about ten minutes. The heated solution or reaction product is now ready for use as a binder. If this solution is left in the open air, it will set and harden by itself within a period of say 24 to 48 hours. By the application of heat the aforesaid solution will set and harden in a short period, for instance, 6 to 10 minutes, to a hard, tough and strong plastic material which is not sticky to touch and which resembles a resin in appearance.

When it is desired to use the reaction product as a binder for compressed fibrous materials, the product may be mixed thoroughly with fibrous material, for instance, in accordance with my fuming process of making compressed products set forth in my application Serial No. 346,811, filed March 13, 1929. The treated fibrous material is subjected preferably in a mold to a heat of say about 200° C. and pressure of several hundred pounds per square inch. By maintaining the said pressure and heat on the molded fibrous mass for about 4 to 6 minutes, a hard, strong board is produced. This board can be made of any size but if the above-mentioned amount of binder is used a board 18" x 18" x ½" of compressed and cemented fibrous material can be made.

Example No. 2

As noted in Example No. 1, 500 grams of sugar, preferably brown cane sugar, is thoroughly mixed in about 1000 cubic centimeters of say 40% fomaldehyde solution. When the sugar is completely mixed in the formaldehyde solution, heat is applied to the solution until a temperature of approximately 40° C. is attained. The solution is maintained at this temperature for about 10 minutes. After the expiration of this period, about 10 grams of sodium sulfite ($Na_2SO_3$) is added to the heated solution in small amounts while the temperature of the solution is increased to about 60° C. The temperature is preferably maintained at 60° C. for about 10 minutes. When this time has expired the mass of material is ready for use in the production of plastic masses and of cemented products.

The plastic material produced in this example sets and hardens by itself in the open air within a period of about 12 to 24 hours. Under the influence of heat, say at a temperature of 180° to 200° C., the plastic material sets in about 4 to 6 minutes to a relatively hard, strong, tough and resin-like solid.

If the aforesaid plastic material is used as a binder or cementitious substance for fibrous particles, such as sawdust or wood shavings, the plastic material is mixed thoroughly with said particles. The thus-treated mass may be permitted to set and harden in the open air but I prefer to subject the mass to heat and pressure as in my pending application referred to hereinabove. By applying a pressure of about several hundred pounds per square inch and a temperature of about 180° to 200° C. to the fibrous material containing the plastic substance, a dense hard board is obtained. This board is harder than the board obtained in Example No. 1.

*Example No. 3*

The procedure followed in this example is the same as that given in the above two examples except 800 grams of sugar is used instead of 500 grams. A plastic material is produced which has qualities between the materials of Examples No. 1 and No. 2 and which can be used like those materials. It is to be noted that plastic materials produced in accordance with my invention are substantially waterproof.

*Example No. 4*

To the unset plastic material of Example No. 3, 10 grams of sodium sulfite ($Na_2SO_3$) are added in small amounts. Following the addition of sodium sulfite, the same procedure is followed as given in Example No. 2. The plastic material thus produced can be used as a very efficient cementitious substance or binder or can be used for any other purpose to which a plastic material is suitable.

*Example No. 5*

In this instance, 400 cubic centimeters are mixed very thoroughly in about 1000 cubic centimeters of 40% formaldehyde solution. This solution is heated to about 40° C. for approximately ten minutes when the material is ready for use as a binder. If this heated material is allowed to stand in the open air it sets or hardens by itself. The setting or hardening can be speeded or facilitated by the application of heat or of heat and pressure. By this procedure a plastic material is obtained which can be used in the same way as the materials from the examples hereinabove mentioned.

*Example No. 6*

The plastic material obtained in Example No. 5 may be used for the production of a quick-setting binder by the addition to the unset plastic material of about 5 grams of sodium sulfite ($Na_2SO_3$) in small amounts at any one time. When the sodium sulfite has all been added the temperature of the solution is raised to about 60° C. and is maintained at that temperature for about 10 minutes. After this time has elapsed a plastic material is obtained which is very effective as a binder for fibrous substances and the like. Of course, the plastic material can be used for other purposes well known to those skilled in the art.

Although I have specified certain proportions for the ingredients of my novel plastic compound, it is to be observed that variations in the proportions can be employed. For instance, the amount of sugar-containing material can be increased up to an amount where no more of the material will dissolve in the formaldehyde solution. Then again the amount of sodium sulfite can be varied according to the desired setting or hardening period and the degree of hardness required in the finished product, e. g. compressed wood masses. These variations as well as the substitution of equivalent ingredients or the use of similar functioning temperatures are considered to be within the spirit of my invention and the purview of my invention.

I claim:

1. A composition of matter comprising a sugar-containing substance and formaldehyde capable of hardening into a water insoluble mass.

2. A composition of matter comprising a sugar-containing substance, formaldehyde and sodium sulfite capable of hardening into a water insoluble mass.

3. A composition of matter comprising a sugar-containing substance, formaldehyde, sodium sulfite and a filler capable of hardening into a water insoluble mass.

4. A composition of matter comprising a sugar-containing substance, formaldehyde, sodium sulfite, and a fibrous material.

5. A resin-like plastic composition of matter comprising a product resulting from the reaction of sugar and an aqueous solution of formaldehyde, said composition being capable of hardening into a water insoluble mass.

6. A resin-like plastic composition of matter comprising a product resulting from the reaction of sugar and an aqueous solution of formaldehyde and sodium sulfite, said composition being capable of hardening into a water insoluble mass.

7. A resin-like plastic composition of matter comprising a product resulting from the reaction of a mass of sugar-containing material with approximately twice its mass of formaldehyde solution at a temperature of about 40° C., said composition being capable of hardening into a water insoluble mass.

8. A resin-like plastic composition of matter comprising a substance produced by reacting approximately one part of a sugar-containing material with approximately two parts of a 40% formaldehyde solution and maintaining said ingredients at a temperature of about 40° C. for approximately ten minutes, said composition being capable of hardening into a water insoluble mass.

9. A resin-like plastic composition of matter comprising a substance produced by reacting approximately one part of a sugar-containing material with approximately two parts of a 40% formaldehyde solution and maintaining said ingredients at a temperature of about 40° C. for approximately ten minutes and then adding sodium sulfite to said reaction product, said composition being capable of hardening into a water insoluble mass.

10. A resin-like plastic composition of matter comprising a substance produced by reacting approximately one part of a sugar-containing material with approximately two parts of a 40% formaldehyde solution and maintaining said ingredients at a temperature of about 40° C. for approximately ten minutes and then slowly adding a small amount of sodium sulfite to said reaction product and thereafter increasing the temperature to about 60° C. for about ten minutes, said composition being capable of hardening into a water insoluble mass.

11. A composition of matter comprising a product resulting from the reaction of a sugar-containing substance and an aqueous formaldehyde solution under the influence of heat, and a fibrous material distributed throughout said reaction product, said composition being capable of hardening into a water insoluble mass.

12. A board-like product resulting from the subjection of a mixture of a reaction product of sugar and formaldehyde, and a fibrous material to heat and pressure whereby the reaction product of sugar and formaldehyde is hardened into a water insoluble mass.

13. A board-like product resulting from the subjection of a mixture of a reaction product of sugar and formaldehyde, sodium sulfite, and a fibrous material to heat and pressure whereby the reaction product of sugar and formaldehyde is hardened into a water insoluble mass.

14. A board-like product comprising a mass of fibrous material compressed together and bonded by a water insoluble mass containing an insoluble reaction product of sugar and formaldehyde.

In witness whereof I have hereunto set my hand.

ADOLF HAWERLANDER.